US005537589A

United States Patent [19]
Dalal

[11] Patent Number: 5,537,589
[45] Date of Patent: Jul. 16, 1996

[54] METHOD AND SYSTEM FOR EFFICIENTLY PERFORMING DATABASE TABLE AGGREGATION USING AN AGGREGATION INDEX

[75] Inventor: Ketan Dalal, Seattle, Wash.

[73] Assignee: Microsoft Corporation, Redmond, Wash.

[21] Appl. No.: 268,231

[22] Filed: Jun. 30, 1994

[51] Int. Cl.$^6$ .................................................. G06F 15/00
[52] U.S. Cl. ............................. 395/600; 364/DIG. 1; 364/282.1; 364/283.4; 364/246.3
[58] Field of Search ................ 395/600; 364/DIG. 1, 364/DIG. 2

[56] References Cited

U.S. PATENT DOCUMENTS

| | | | |
|---|---|---|---|
| 5,033,009 | 7/1991 | Dubnoff | 364/523 |
| 5,231,577 | 7/1993 | Koss | 364/419 |
| 5,241,648 | 8/1993 | Cheng et al. | 395/600 |
| 5,261,093 | 11/1993 | Asmuth | 395/600 |
| 5,272,628 | 12/1993 | Koss | 364/419.19 |
| 5,367,677 | 11/1994 | Stanfill | 395/600 |

Primary Examiner—Thomas G. Black
Assistant Examiner—Jean R. Homere
Attorney, Agent, or Firm—Seed and Berry

[57] ABSTRACT

A method and system for efficiently performing database table aggregation is provided. In a preferred embodiment, an aggregation facility efficiently aggregated a source table using indices on an aggregated column of the source table and a grouping column of the source table. The facility uses the index on the aggregated column to identify the contents of the aggregated column in each row of the source table. The facility further uses information derived from the index on the grouping column to identify the contents of the grouping column in each row of the source table. For each row of the source table, the facility aggregates the identified aggregated column contents into a result value for the identified grouping column contents. In a further preferred embodiment, the facility generates a relation mapping from source table row to grouping column, which the facility uses to identify the contents of the grouping column in each row of the source table. In a further preferred embodiment, the facility may be used to perform multiple-level aggregations, as well as aggregations in which there are multiple grouping columns, multiple aggregated columns, and/or multiple result columns.

7 Claims, 12 Drawing Sheets

| Bookmark | Division | Salesperson | Sales Price | Order Date |
|---|---|---|---|---|
| 1 | retail | Ettenger | $ 50.00 | 4/25/94 |
| 2 | catalog | Garvis | $ 45.50 | 4/25/94 |
| 3 | telemarketing | Chronister | $ 50.00 | 4/27/94 |
| 4 | telemarketing | Akins | $ 55.00 | 4/28/94 |
| 5 | retail | Ettenger | $ 42.00 | 4/28/94 |
| 6 | retail | Dripps | $ 42.00 | 4/28/94 |
| 7 | catalog | Garvis | $ 50.00 | 4/29/94 |

Orders Table

PRIOR ART

FIG. 1

| Bookmark | Division | sum(SalesPrice) |
|---|---|---|
| 1 | retail | $ 134.00 |
| 2 | catalog | $ 95.00 |
| 3 | telemarketing | $ 100.50 |

Result Table

PRIOR ART

FIG. 2

Division Index

510
- 511 Bookmark
- 512 Bit

| Bookmark | Bit |
|---|---|
| 1 | 0 |
| 2 | 1 |
| 3 | 0 |
| 4 | 0 |
| 5 | 0 |
| 6 | 0 |
| 7 | 1 |

Division = "catalog" Bitmap

FIG. 5A

520
- 521 Bookmark
- 522 Bit

| Bookmark | Bit |
|---|---|
| 1 | 1 |
| 2 | 0 |
| 3 | 0 |
| 4 | 0 |
| 5 | 1 |
| 6 | 1 |
| 7 | 0 |

Division = "retail" Bitmap

FIG. 5B

530
- 531 Bookmark
- 532 Bit

| Bookmark | Bit |
|---|---|
| 1 | 0 |
| 2 | 0 |
| 3 | 1 |
| 4 | 1 |
| 5 | 0 |
| 6 | 0 |
| 7 | 0 |

Division = "telemarketing" Bitmap

FIG. 5C

| Bookmark | 112 Division | Salesperson | sum(Sales Price) |
|---|---|---|---|
| 1 | retail | Dripps | $ 42.00 |
| 2 | retail | Ettenger | $ 92.00 |
| 3 | catalog | Garvis | $ 95.50 |
| 4 | telemarketing | Chronister | $ 50.00 |
| 5 | telemarketing | Akins | $ 55.00 |

Result Table

FIG. 10

| Bookmark | Division | sum(Sales Price) | max(Sales Price) |
|---|---|---|---|
| 1 | retail | $ 134.00 | $ 50.00 |
| 2 | catalog | $ 95.50 | $ 50.00 |
| 3 | telemarketing | $ 105.00 | $ 55.00 |

Result Table

FIG. 12

METHOD AND SYSTEM FOR EFFICIENTLY PERFORMING DATABASE TABLE AGGREGATION USING AN AGGREGATION INDEX

TECHNICAL FIELD

The invention relates generally to a method and system for manipulating data stored in a database, and, more specifically, to a method and system for efficiently performing database table aggregation.

BACKGROUND OF THE INVENTION

A database system (database) is a set of computer programs used by a user to store and retrieve data. Such data is often limited to text (letters, numerals, symbols, and other characters), but may include any data that may be stored by a computer. Most databases store data in tables. A table is a series of rows, also called records. Each row contains data about a particular thing, such as a merchandise order. The rows are divided into columns. The intersection of a row and column is referred to as a field. Each column specifies a particular type of data that is contained in each field of the column. Each field contains the data of the particular type for the intersecting row and column. Databases typically return data from a table one row at a time, though it is common for them to actually retrieve data in larger quantities, reflecting the probability that they will be requested to return succeeding rows from the same table. This technique is called buffering.

FIG. 1 is a table diagram showing the contents of a sample Orders table containing data about each of several sales orders. The Orders table 100 has seven rows, each containing information about a different sales order. The Orders table has columns as follows: a Division column 101 containing the name of the division that took each order, a Salesperson column 102 containing the last name of the salesperson who took each order, a Sales Price column 103 containing the price for each order, and an Order Date column 104 which contains the date on which each order was placed. The Orders table also contains a bookmark column 110, which contains a value uniquely identifying each row in the table that can be used to quickly locate and retrieve the row. Such a value is known as a bookmark. It should be appreciated the size of the Orders table has been severely constrained to provide a manageable example. It is common for actual tables of this type to contain thousands, or even millions, of records, each 200 bytes or more long.

Most databases also have a query processor to manipulate data stored in one or more tables in response to instructions, called "queries," from users. One way in which a query processor can manipulate data stored in a table is to aggregate the data. Aggregation is an operation in which the query processor generates a result table that contains the results of a computation performed on the data in a source table, such as the Orders table. An aggregation is defined by specifying a source table, and, within the source table, an aggregated column and a grouping column. The result table contains columns corresponding to the aggregated column and grouping column of the source table. The result table contains one row for each unique value in the grouping column of the source table. Each row contains the unique grouping column value and the aggregate of all of the aggregated column values for the rows of the source table having the unique grouping column value. Aggregates are formed using aggregation functions such as "sum," "average," "standard deviation," "number," "minimum," or "maximum."

As an example of aggregation, the Sales Price column 103 of the Orders table may be aggregated over the Division column 101 using the "sum" aggregation function. In this aggregation, the Division column 101 is the grouping column, and the Sales Price column 103 is the aggregated column, which is aggregated using the "sum" function—that is, for each unique value of the Division column, all of the Sales Price column values are added. In Structured Query Language (SQL), this aggregation is expressed as follows:

SELECT sum([Sales Price]) FROM [Orders] GROUP BY [Division]

FIG. 2 is a table diagram showing the result table formed by the sample aggregation. The result table 200 contains a Division column 201 and a sum of Sales Price column 203, as well as a bookmark column 210, which contains a value uniquely identifying each row in the result table that can be used to quickly locate and retrieve the row. The result table contains one row for each distinct value in the division column 101 of the source table. For each row, the Division column 201 field contains the name of one of the divisions, and the sum of Sales Price column 203 field contains the sum of the Sales Price column 103 field values for all of the rows of the source table having that division value. For instance, the first row of the result table contains the division name "retail" in the Division column 201 field, and the value "$134.00" in the sum of Sales Price column 203 field—that is, the sum of sales prices from the first, fifth, and sixth rows of the source table, each of which has the value "retail" in the Division column 101 field.

The conventional technique for performing aggregations such as the one described above involves reading the entire source table, which can take a considerable period of time for source tables of typical sizes. According to the conventional aggregation technique, the query processor causes the database to return each row of the source table in succession. For each row of the source table, the query processor first reads the contents of the grouping column field from the returned row and identifies the corresponding row of the result table. The query processor then reads the contents of the aggregated column field from the returned row and aggregates these contents into the aggregated column field of the identified row of the result table. These steps are repeated for every row of the source table. Conventional techniques that read every row of the source table are often impractical, since reading an entire data table usually imposes a large demand on disk access services, resulting in relatively long execution time for the aggregation.

SUMMARY OF THE INVENTION

It is an object of the invention to provide a method and system in a computer system for efficiently performing database table aggregations.

It is another object of the invention to provide a method and system in a computer system for aggregating a source table using indices on a grouping column and an aggregated column of the source table.

These and other objects, which will become apparent as the invention is more fully described below, are provided by a method and system for efficiently performing database table aggregation. In a preferred embodiment, an aggregation facility efficiently aggregates a source table using indices on an aggregated column of the source table and a grouping column of the source table. An index is a relation that maps from a value of an indexed column, such as the aggregated column to rows of a table containing that value in the indexed column. Indices are generally used to find rows of a table having a particular value in the indexed column. The facility uses the index on the aggregated column to identify the contents of the aggregated column in each row of the source table. The facility further uses information derived from the index on the grouping column to identify the contents of the grouping column in each row of the source table. For each row of the source table, the facility aggregates the identified aggregated column contents into a result value for the identified grouping column contents. In a further preferred embodiment, the facility generates a relation that maps from source table row to grouping column, which the facility uses to identify the contents of the grouping column in each row of the source table. In a further preferred embodiment, the facility may be used to perform multiple-level aggregations, as well as aggregations in which there are multiple grouping columns, multiple aggregated columns, and/or multiple result columns.

BRIEF DESCRIPTION OF THE DRAWINGS

FIG. 1 is a table diagram showing the contents of a sample Orders table containing data about each of several sales orders, which may be aggregated either by prior art methods or by the invention.

FIG. 2 is a table diagram showing the result table formed by a sample aggregation of the Orders table shown in FIG. 1, which may be produced by prior art methods or by the invention.

FIG. 5 is a bitmap diagram showing bitmaps generated from the Division index shown in FIG. 4 by the facility in a GenerateBitmaps routine.

FIG. 10 is a table diagram showing the result table created in response to a multiple grouping column query.

FIG. 12 is a table diagram showing the result table created in response to a multiple aggregation result column aggregation query.

DETAILED DESCRIPTION OF THE INVENTION

Figure 3:
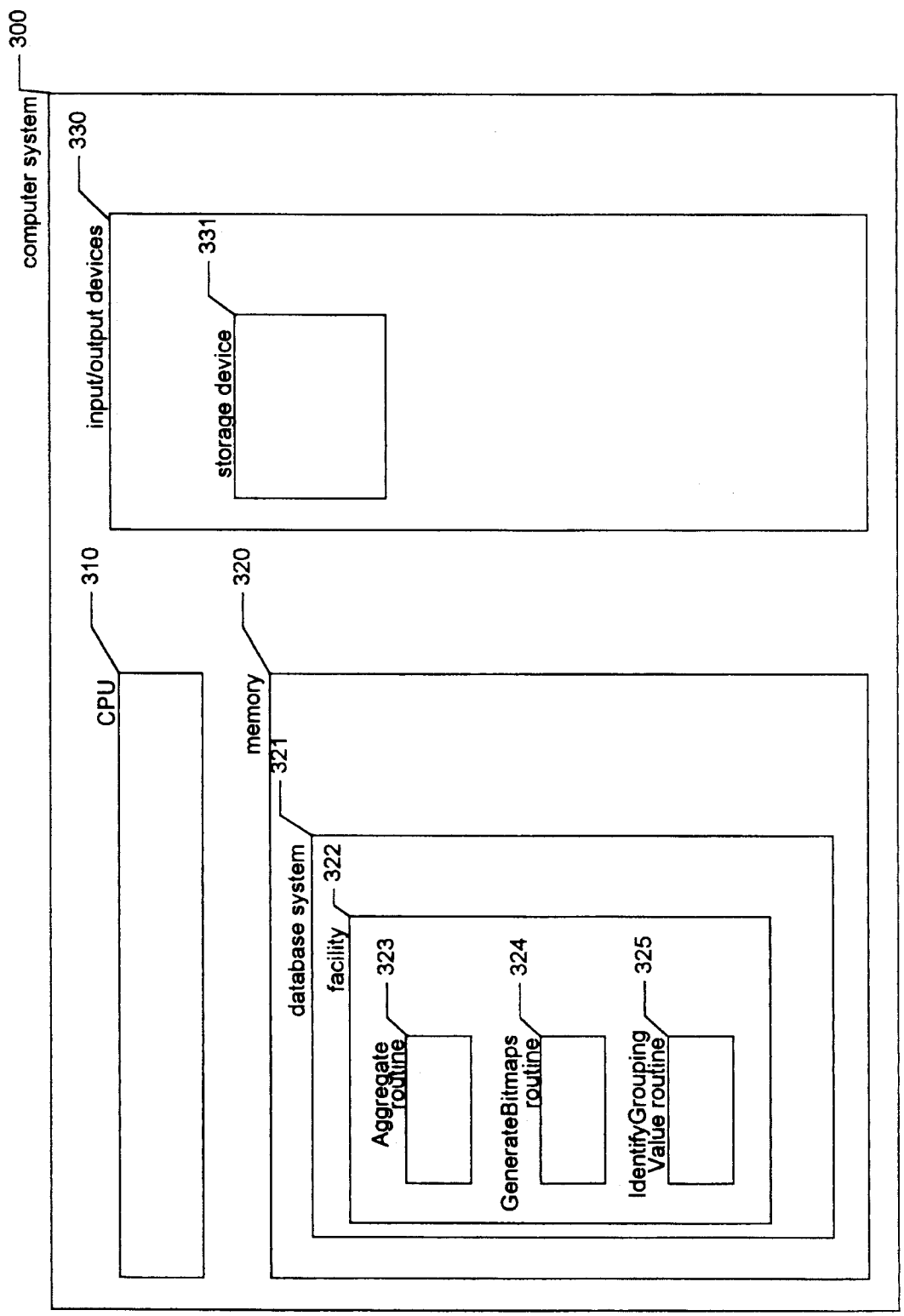
FIG. 3 is a high-level block diagram of the general-purpose computer system upon which an aggregation software facility of the present invention for efficiently aggregating source tables preferably operates.

The present invention provides a method and system for aggregating information stored in a database source table. In response to an aggregation query from a user specifying a source table, as well as a grouping column and an aggregated column of the source table, an aggregation software facility("the facility") generates a summary of data in the aggregated column such that the summary is grouped according to the data in the grouping column. In a preferred embodiment, the facility aggregates information using database indices that are automatically maintained for the source table, rather than using the source table directly. A database index contains entries that map values for a column of the source table to the rows in the source table that contain those values. The facility maintains an index for each grouping column and aggregated column. These indices are referred to as the grouping index and the aggregated index. For example, to generate the aggregation of FIG. 2, the facility maintains two database indexes onto the Orders table of FIG. 1. The grouping index is on the Division column (Division index), and maps each value of the Division column to the corresponding rows in the Orders table that contain that value. The aggregated index is on the Sales Price column (Sales Price index), and maps each value of the Sales Price column to the corresponding rows in the Orders table that contain that value. The facility performs an aggregation by retrieving each entry from the aggregated index. For each row that contains the value of the retrieved entry, the facility scans the grouping index for the entry that contains that row number. When the entry is found, the facility uses the value in that entry for the aggregation. Continuing with the example of FIG. 2, when the result table is generated (i.e., the aggregation performed), the facility retrieves each entry from the Sales Price index and for each corresponding row in the entry facility, the facility finds the entry in the Division index that maps to that row. The facility retrieves the Division value from that found entry and adds the current sales price value into the total for the retrieved Division value. By using these indices, the facility can perform aggregation without accessing the source table directly, thereby greatly reducing the disk access overhead incurred in performing the aggregation.

In order to expedite the determination of the grouping value for each retrieved bookmark, the facility preferably inverts the grouping column index so that it maps from bookmark to grouping column value rather than from grouping column value to bookmark. In a preferred embodiment, the facility inverts the index for each grouping column by creating a set of bitmaps from the index for the grouping column. The facility preferably creates one bitmap for each unique value in the grouping column. Each bitmap indicates, for the unique value of the grouping column to which it corresponds, whether each row of the source table contains that grouping column value. When the facility retrieves a bookmark from the aggregated column index, it interrogates the bitmaps to identify the bitmap that indicates that the row corresponding to the retrieved bookmark contains a 1 in the position that corresponds to that bookmark. The row of the result table that corresponds to that bitmap is updated by aggregating the aggregated column value from the current row of the aggregated column index into the result value of the row. The set of bitmaps generated together represent a relation mapping bookmark to grouping column value. Other kinds of relations that map from bookmark to grouping column value may be substituted for a set of bitmaps. For example, in an alternative embodiment, the facility uses a single hash table to map from bookmark to grouping column value. Employing a hash table is particularly useful when the database system utilizes bookmarks that are not consecutive integers, since using bitmaps to map from such bookmarks either results in very sparse bitmaps, i.e., a set of bitmaps in which certain bits are not set in any bitmap, or requires an additional mapping from bookmark to bit.

FIG. 3 is a high-level block diagram of the general-purpose computer system upon which the facility preferably operates. The computer system 300 contains a central processing unit (CPU) 310, a computer memory (memory) 320, and input/output devices 330. Among the input/output devices is a storage device 331, such as a hard disk drive. The memory contains software for a database system (database) 321, which includes the facility 322. The facility 322 includes an Aggregate routine 323 for aggregating a source table, a GenerateBitmap routine 324 for generating a set of bitmaps from a grouping column index, and an IdentifyGroupingValue routine 325 for determining the grouping value for a bookmark. This software executes on the CPU. A user uses the database system to generate an aggregation request, which is processed by the facility. The facility invokes the Aggregate routine, which in turn invokes the GenerateBitmap and IdentifyGroupingValue routines.

Figure 4:
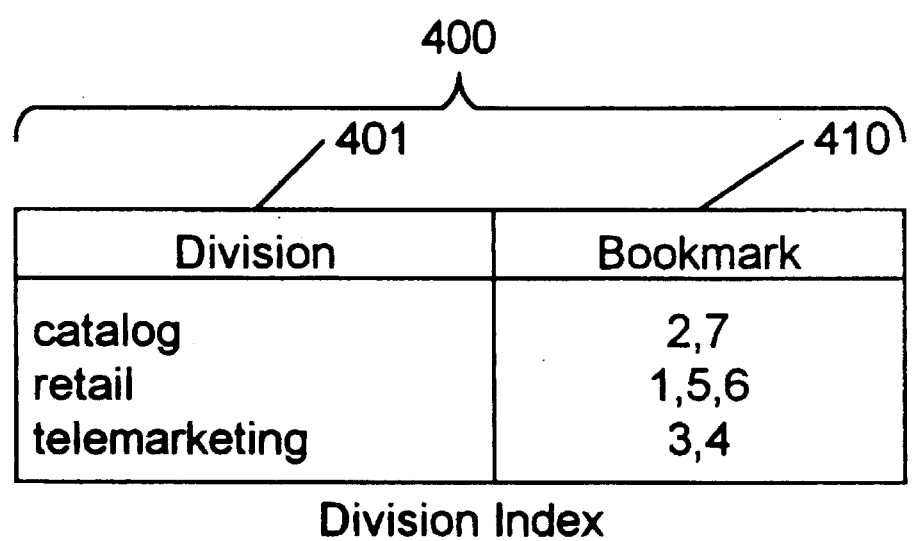
FIG. 4 is an index diagram showing an index on the Division column of the Orders table shown in FIG. 1.

The facility's aggregation of the source table shown in FIG. 1 to produce the result table shown in FIG. 2 is discussed in order to demonstrate the operation of the facility. The facility first generates a set of bitmaps from the index on the grouping column, i.e., the Division column 101, which is used as discussed below to perform the aggregation. FIG. 4 is an index diagram showing the index on the Division column. The division index 400 contains two columns: a Division column 401 and a Bookmark column 410. Each row of the index corresponds to a unique value from the Division column 101 of the Orders table and contains that Division field value and the bookmark field values from those rows of the Orders table that have that value in the Division Field. For example, the first row of the index contains the Division field value "catalog" and the bookmarks "2" and "7" indicating that the second and seventh rows of the Orders table have Division field value "catalog." Such an index might be used to quickly access rows of the indexed table having a particular indexed column value. For this reason, the rows of the index are sorted by Division field value. While some databases construct indices that contain search trees, hashing, or other techniques, that permit a row of the index with a particular indexed column value to be found in less time than is required for linear traversal of the index, this is not required by the facility.

The facility preferably causes the indices required to aggregate a table to be created and maintained. The steps required to maintain an index on a column of a table are well known to those skilled in the art. The facility preferably identifies columns of table for which to maintain indices by inquiring of the user that creates each table whether each column of the created table may be used as a grouping column or an aggregated column. This technique has the advantage that it incorporates the explicit intention of users in the identification. Alternatively, the facility preferably maintains indices on every column of every table, obviating such an inquiry of the user. The technique has the advantage that it is comprehensive, and will therefore prevent the request of an aggregation for which a necessary index has not been maintained.

The facility generates a set of bitmaps from the index on the Division column. FIG. 5 is a bitmap diagram showing the bitmaps generated from the Division index by the facility in the GenerateBitmaps routine. A "catalog" bitmap 510 corresponds to the grouping value "catalog," and contains indications of whether each row of the source table, as identified by its bookmark, has the grouping value "catalog"—i.e., whether the Division column of the source table contains the value "catalog." A "retail" bitmap 520 and a "telemarketing" bitmap 530 similarly correspond to the grouping values "retail" and "telemarketing," respectively, and each contain indications of whether each row of the source table, as identified by its bookmark, has these grouping values.

The bitmaps 510, 520, and 530 are each shown as a table having a bookmark column (e.g., 511) and a bit column (e.g., 512). Each bitmap row contains a bookmark for a different row of the source table in the bookmark column and a bit indicating in the bit column whether that row has the grouping value to which the table corresponds. For example, the first row shown for the catalog bitmap has a "1" in the bookmark column and a "0" in the bit field, indicating that the first row of the source table does not contain the value "catalog" in the Division field. Inversely, the second row shown for the catalog bitmap has a "2" in the bookmark column and a "1" in the bit field, indicating that the second row of the source table does contain the value "catalog" in the Division field. In a preferred embodiment, however, bitmaps are represented as a string of bits corresponding to the values in the bits column (e.g., 512), without any intervening bookmarks. The bit for a particular bookmark is accessed using an offset from the beginning of the string of bits calculated from the bookmark value. As an example, the catalog bitmap 510 would be represented as "0100001"; the retail bitmap 520 would be represented as "1000100"; and the telemarketing bitmap 530 would be represented as "0011000".

Figure 6:
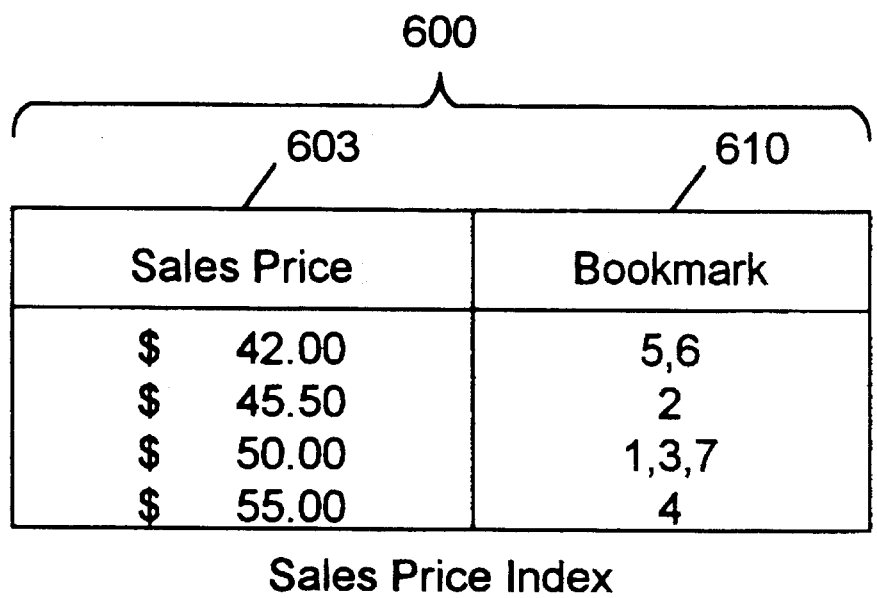
FIG. 6 is an index diagram showing the index on the Sales Price column of the Orders table shown in FIG. 1.

The facility then traverses an index on the aggregated column of the source table in order to perform the aggregation. Traversing an index refers to looping through the rows of an index, and for each row of the index, looping through each bookmark in the row. FIG. 6 is an index diagram showing an index on the Sales Price column. The Sales Price index 600 contains two columns: a Sales Price column 603 and a Bookmark column 610. Each row of the index corresponds to a unique value from the Sales Price column of the Orders table, and contains that Sales Price field value and the bookmark field value from those rows of the Orders table having that value in the Sales Price field. For example, the first row of the index contains the Sales Price field value "$42.00" and the bookmark field values "5" and "6," indicating that the fifth and sixth rows of the Orders table have the Sales Price field value $42.00.

For each row of the Sales Price index, the facility interrogates the bitmaps generated from the Division index by the facility in the GenerateBitmaps routine to determine the grouping value for the bookmark value in the row of the Sales Price index. For example, for the first row of the Sales Price index, the facility interrogates the bitmaps in turn for the bookmark "5." By interrogating the catalog bitmap, the facility is able to determine that the grouping value for the bookmark "5" is not "catalog," since the row of the catalog bitmap having a "5" in the bookmark column has a "0" in the bit column. By interrogating the retail bitmap, the facility is able to determine that the grouping value for the bookmark "5" is "retail," since the row of the retail bitmap having a "5" in the bookmark column has a "1" in the bit column. Because the facility determines that the grouping value for the bookmark "5" is "retail," it preferably omits interrogating the telemarketing bitmap.

Because the facility determines that the grouping value for the bookmark "5" is "retail," the facility uses the aggregation function, "sum," to aggregate the current aggregated value from the current row of the Sales Price index, "$42.00," into the result value for the grouping value "retail." In a preferred embodiment, this involves adding $42.00 to the value contained in the sum of sales price column 203 of the result table. The facility continues traversing the Sales Price Index, determining the grouping value and aggregating the aggregated value into the result value for each row of the Sales Price index until the last row of the Sales Price index is processed and the aggregation is complete.

Figure 7:
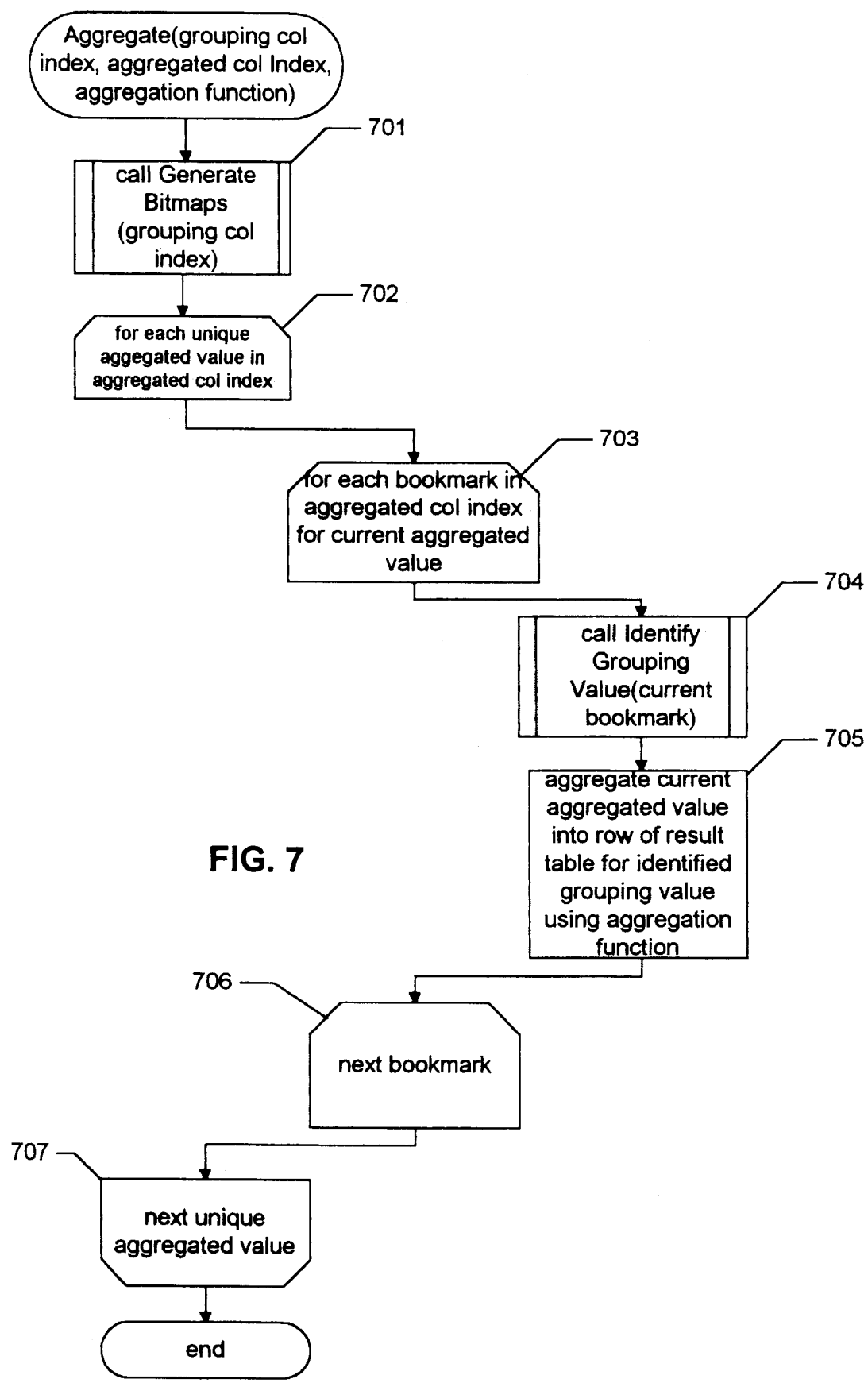
FIG. 7 is a flow diagram showing a Aggregate routine contained by the facility for aggregating a table using bitmaps.

FIG. 7 is a flow diagram showing the Aggregate routine 323 contained by the facility for aggregating a table. The routine receives the following arguments: an index on the grouping column of the source table to be aggregated, an index on the aggregated column of the source table, and the aggregation function. These indices are identified by the facility in response to an aggregation request from the user identifying the grouping column and the aggregation column. The aggregation request from the user also identifies the aggregation function. Briefly, in the routine, the facility generates a set of bitmaps from the grouping column index, then uses the bitmaps with the aggregated column index to identify the aggregated value and grouping value for each column, which it uses to aggregate the aggregated value into the result value for the grouping value.

In step 701, the facility calls a GenerateBitmaps routine in order to generate a set of bitmaps from the grouping column index. The GenerateBitmaps routine is discussed in detail below. In steps 702–707, the facility loops through each unique aggregated value in the aggregated column index. Step 702 marks the beginning of this unique aggregated value loop, and step 707 the end. These "loop limit" symbols are discussed on page 6 of ANSI/ISO 5807-1985, a standard for, among other things, symbols and conventions for program flowcharts promulgated by the International Standards Organization and adopted by the American National Standards Institute. In steps 703–706, within the unique aggregated value loop, the facility loops through each bookmark in the aggregated column index for the current aggregated value in the unique aggregated value loop. Step 703 marks the beginning of this bookmark loop, and step 706 the end. In step 704, the facility calls an IdentifyGroupingValues routine in order to determine the correct grouping value for the current bookmark in the bookmark loop using the bitmaps generated in step 701. The IdentifyGroupingValues routine is discussed in detail below. In step 705, the facility aggregates the current aggregated value in the unique aggregated value loop into the result value for the grouping value identified in step 704. This involves applying the aggregation function specified as a parameter to the Aggregate routine, such as "sum." In the case of "sum," the aggregated value is added to the result value. The result value is preferably maintained in the row of the result table for the identified grouping value. In step 706, the facility repeats steps 704–705 for the next bookmark in the aggregated column index for the current aggregated value in the unique aggregated value loop, if any remain. In step 707, the facility repeats steps 703–706 for the next unique aggregated value in the aggregated column index, if any remain. The Aggregate routine then returns.

Figure 8:
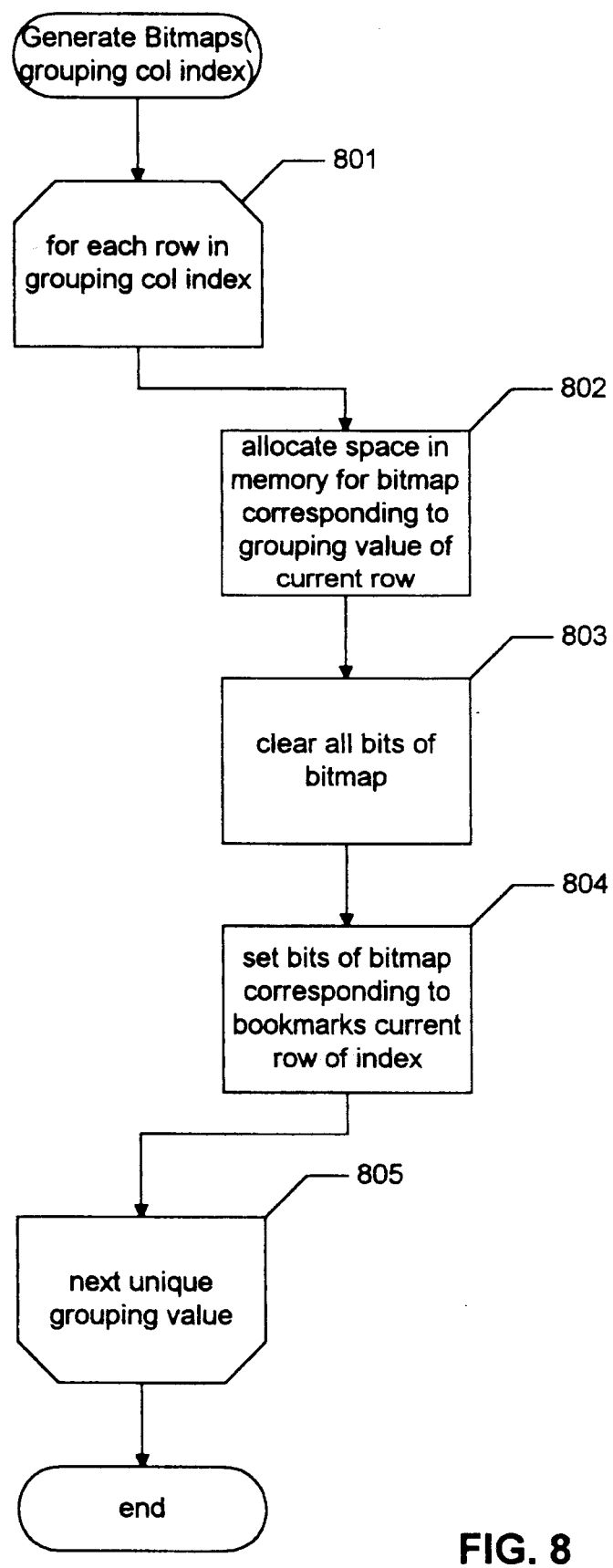
FIG. 8 is a flow diagram showing the GenerateBitmaps routine contained by the facility to generate a set of bitmaps from a grouping column index, such as the Division index shown in FIG. 4.

FIG. 8 is a flow diagram showing the GenerateBitmaps routine 324 contained by the facility to generate a set of bitmaps from a grouping column index. The routine receives the grouping column index from which it is to generate a set of bitmaps as an argument. In steps 801–805, the facility loops through each unique grouping value in the grouping column index—that is, each row of the grouping column index. Step 801 marks the beginning of this unique grouping value loop, and step 805 the end. In step 802, the facility allocates an area of the memory large enough to accommodate a bitmap. In step 803, the facility initializes the new bitmap allocated in step 802 by clearing all of its bits—that is, temporarily assigning the bitmap to indicate that none of the rows of the source table have the grouping value to which the new bitmap corresponds. In step 804, the facility uses the grouping column index to set the bits of the bitmap corresponding to the bookmarks in the grouping column index for the current grouping value in the unique grouping column loop—that is, assigning the bitmap to indicate the rows of the source table have the grouping value to which the new bitmap corresponds, according to the grouping column index. In step 805, the facility repeats steps 803–804 for the next row of the grouping column index, if any remain. The GenerateBitmaps routine then returns.

Figure 9:
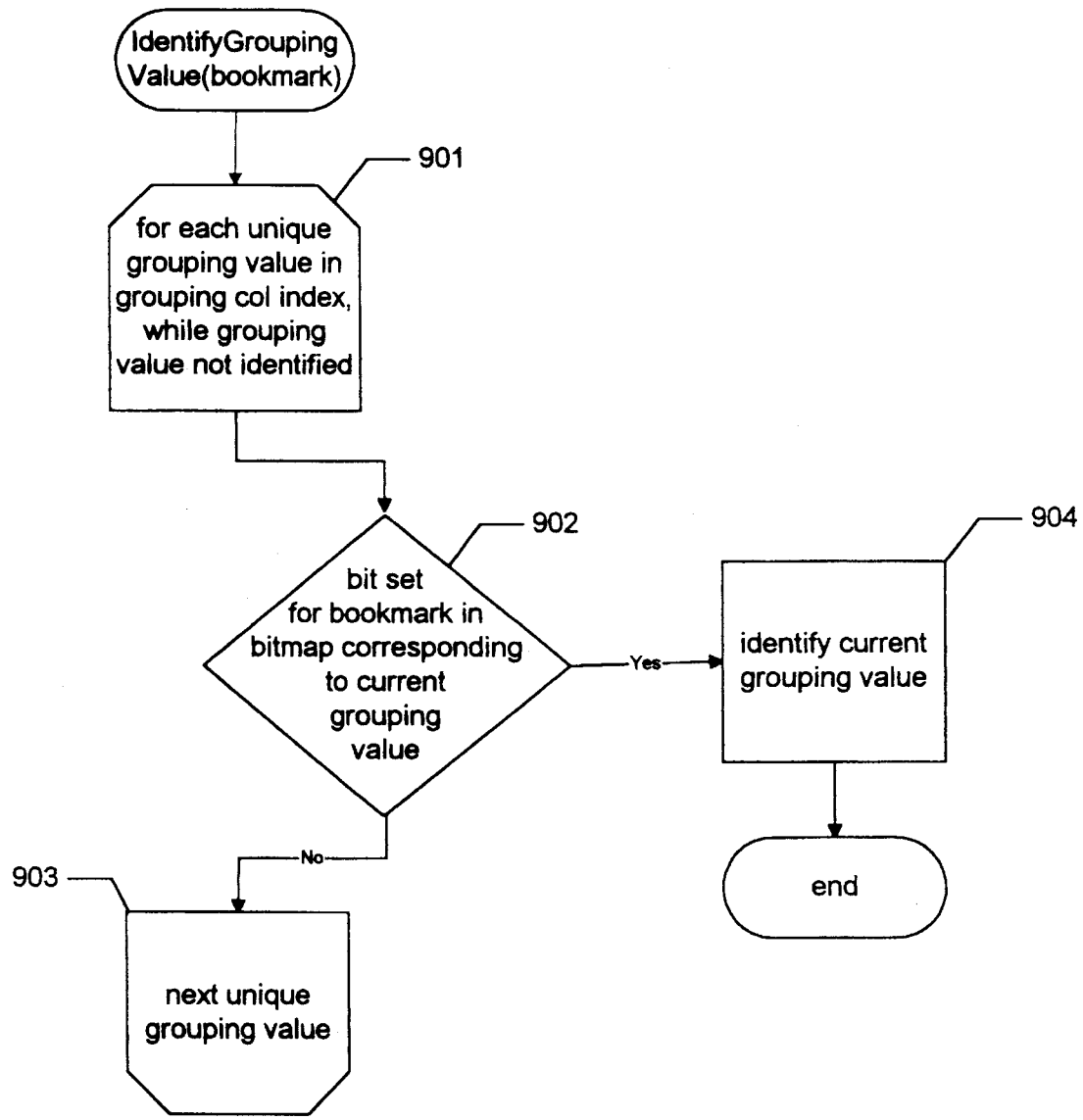
FIG. 9 is a flow diagram showing an IdentifyGroupingValue routine contained by the facility to determine the correct grouping value for a bookmark using the bitmaps generated by the facility.

FIG. 9 is a flow diagram showing the IdentifyGroupingValue routine 325 contained by the facility to determine the correct grouping value for a bookmark using the bitmaps generated by the facility. The routine receives the bookmark for which it is to determine the correct grouping value as an argument. In steps 901–903, the facility loops through each bitmap—that is, each unique grouping value in the grouping column index—while no grouping value has been identified. Step 901 marks the beginning of this unique grouping value loop, and step 903 the end. The current grouping value in the unique grouping value loop corresponds to one of the bitmaps generated by the facility. In step 902, if the bit of this bitmap for the bookmark passed to the routine as an argument is set—that is, if the bitmap indicates that the row of the source table corresponding to the bookmark has the current grouping value—then the facility leaves the unique grouping value loop and continues at step 904, else the facility continues at step 903 to loop to the next current grouping value. The determination of step 902 is known as interrogating a bitmap. In step 904, the facility identifies the current grouping value in the unique grouping value loop. The IdentifyGroupingValue routine then concludes.

As described in detail above, the facility efficiently aggregates a source table using only indices on the grouping column and the aggregated column, thereby performing every aggregation without reading the source table and greatly reducing the disk access overhead incurred.

The facility is also able to perform aggregations that are significantly more complicated than the sample aggregation discussed above. As examples, the facility is preferably able to perform multiple grouping column aggregations, multiple level aggregations, and multiple result column aggregations.

The facility preferably permits the user to specify more than one grouping column in an aggregation query. For instance, given the source table shown in FIG. 1, the user could submit an aggregation query as follows:

SELECT sum([Sales Price]) FROM [Orders]
GROUP BY [Division], [Salesperson]

The above query specifies both the Division column and the Salesperson column as grouping columns for aggregating the Orders table.

FIG. 10 is a table diagram showing the result table created in response to this multiple grouping column query. The result table 1000 contains a Division grouping column 1001, a Salesperson grouping column 1002, a sum of Sales Price aggregated column 1003, and a bookmark column 1010. The result table contains a row for each unique permutation of values of the grouping columns appearing in a row of the source table. For example, the first row of the result table contains the permutation of the grouping value "retail" in the Division column and the grouping value "Dripps" in the Salesperson column. The sum of Sales Price column of the first row therefore contains the sum of Sales Price values from rows of the source table having the value "retail" in the Division column and the value "Dripps" in the Salesperson column, and corresponds to the total of sales made by a salesman named Dripps in the retail division.

When multiple grouping columns are specified in an aggregation query, the facility calls the GenerateBitmaps routine shown in FIG. 8 once for each grouping column, in order to generate a set of bitmaps for each grouping column. In the present example, the facility creates one set of bitmaps for different values of the Division column and one set of bitmaps for different values of the Salesperson column. When traversing the aggregated column index while performing the aggregation, the facility interrogates each set of bitmaps in order to determine the grouping value for each grouping column. The facility then aggregates the current aggregated value into the result value for the permutation of the determined grouping values. That is, in the Aggregate routine shown in FIG. 7, the facility repeats steps 704–705 for each grouping column. As an example, for the first row of the Sales Price index, the facility interrogates the set of bitmaps for different grouping values of the Division column to determine that the Division field of the present row contains the value "retail" and interrogates the set of bitmaps for different grouping values of the Salesperson column to determine that the Salesperson field of the present row contains the value "Ettenger." The facility then aggregates the current Sales Price value "$42.00," into the row of the result table containing the value "retail" and the Salesperson field value "Ettenger."

The facility also preferably permits the user to submit an aggregation query specifying a multiple-level aggregation—that is, specifying that aggregated values be formed for each of two or more grouping columns. For example:

```
SELECT sum([Sales Price]) FROM [Orders] LEVEL 2
    SELECT sum([Sales Price]) FROM [Orders] LEVEL 1
    GROUP BY [Salesperson]
GROUP BY [Division]
```

The above aggregation query specifies aggregating (that is, summing) the Sales Price column of the Orders table, at level 1 for each Salesperson, and at level 2 for each division.

Figure 11:
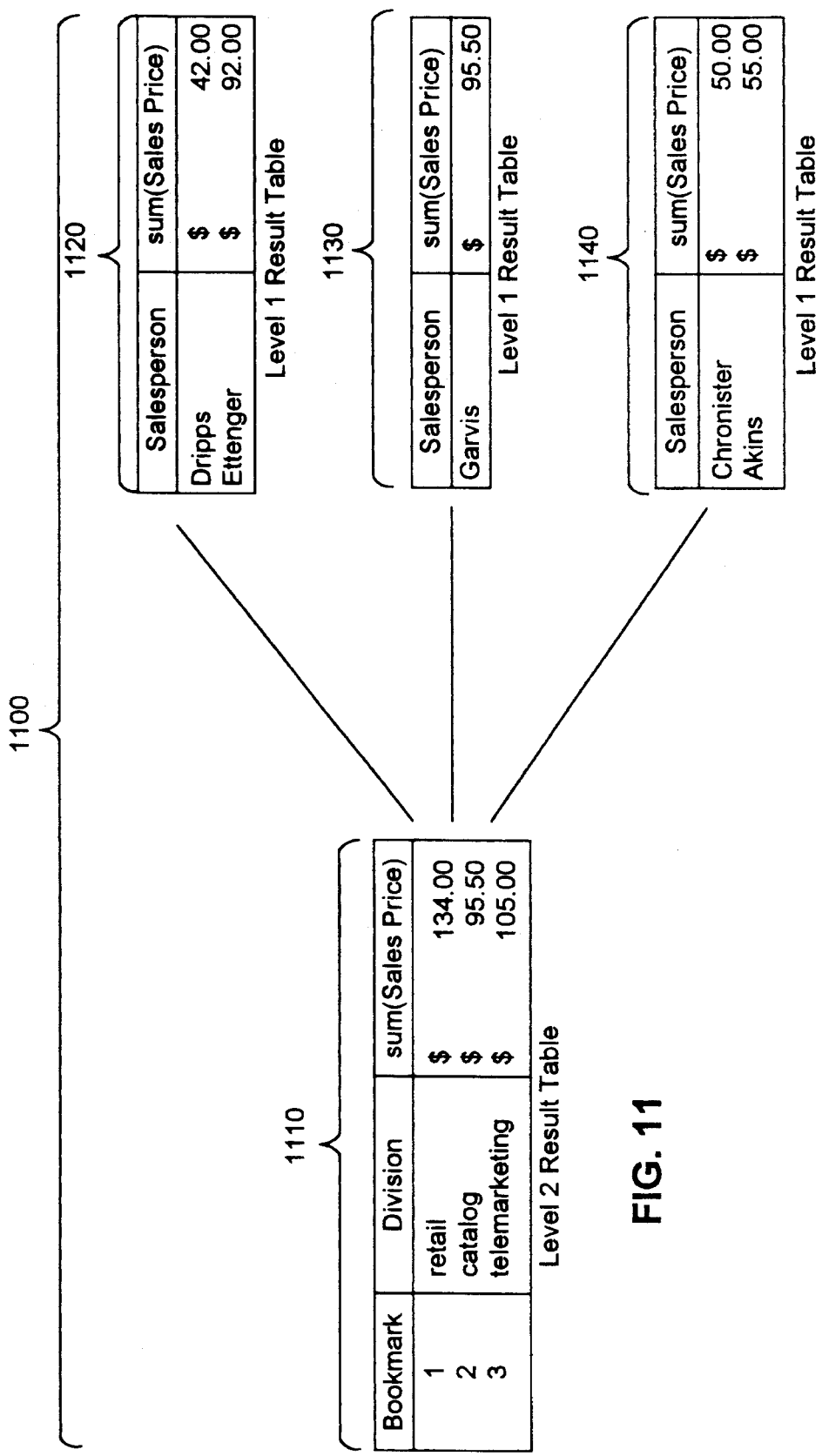
FIG. 11 is a complex table diagram showing the complex result table created in response to a multiple level aggregation query.

FIG. 11 is a complex table diagram showing the complex result table created in response to the multiple level aggregation query. The complex result table 1100 is composed of a level 2 table 1110 and of three level 1 tables, 1120, 1130, and 1140. The level 2 table shows the Sales Price aggregated for each value of the Division column. For instance, the first row of the level 1 table contains the sum of sales price field value "$134.00," corresponding to the total of sales prices for sales obtained by the retail division. Each level 1 table is associated with a single value of the Division column, and therefore one row of the level 2 table. Each level 1 table further shows the Sales Price aggregated for each value of the Salesperson column for rows for which the Division column contains the "retail" value. For instance, level 2 tabled 1120 is associated with the Division column value "retail," and therefore with the first row of the level 1 table. This table contains the sum of sales price field values "$42.00" and "$92.00" for retail Division salespeople "Dripps" and "Ettenger," respectively. The sum of these sales price field values of $134, which is consistent with the sum of sales field value of the first row of the level 2 table corresponding to the total of sales prices for sales obtained by the retail division.

When a multiple-level aggregation is specified in an aggregation query, the facility preferably calls the GenerateBitmaps routine once for each grouping column among the levels, in order to generate a set of bitmaps for each grouping column. That is, step 701 is repeated for each grouping column. In the present example, the facility creates one set of bitmaps for different values of the Division column and one set of bitmaps for different values of the Salesperson column. When traversing the aggregated column index while performing the aggregation, the facility interrogates each set of bitmaps in order to determine the grouping value for each grouping column. That is, step 704 is repeated for each grouping column. The facility then aggregates the current aggregated value into the result value for the permutation of the determined grouping values in each level of the multiple-level aggregation, forming separate result tables for each level. That is, step 705 is repeated for each level of the multiple-level aggregation. As an example, for the first bookmark in first row of the Sales Price index ("5"), the facility interrogates the set of bitmaps for different grouping values of the Division column, then interrogates the set of bitmaps for different grouping values of the Salesperson column. Interrogating the set of bitmaps for different grouping values of the Division column for the bookmark "5" yields the grouping value "retail." Interrogating the set of bitmaps for different grouping values of the Salesperson column for the bookmark "5" yields the grouping value "Ettenger." The facility uses the Division field value produced by interrogating the Division bitmaps to aggregate the current Sales Price value into the correct row of the level 2 table and to select a level 1 table. In the example, the facility uses the Division grouping value "retail" to aggregate the Sales Price value "$42.00" into the first row of the level 2 table and to select level 1 table 1120. The facility uses the Salesperson field value produced by interrogating the Salesperson bitmaps to aggregate the current Sales Price value into the correct row of the selected level 1 table. In the example, the facility uses the Salesperson grouping value "Ettenger" to aggregate the Sales Price value "$42.00" into the second row of level 1 table 1120.

The facility further preferably permits the user to submit an aggregation query specifying more than one aggregation result column. For example:

```
SELECT sum([Sales Price]), maximum ([Sales Price])
    FROM [Orders] GROUP BY [Division]
```

This aggregation query specifies that the result table contains a column for the sum of the Sales Price column for all rows containing a particular grouping field value and a column for the maximum Sales Price for that grouping field value. While both of the aggregates of this example depend on the same column of the source table, this need not be true. FIG. 12 is a table diagram showing the result table created in response to the multiple aggregation result column aggregation query. The result table 1200 contains two aggregated columns: a sum of sales price column 1203 containing the sum of the sales price column values for the rows having each unique Division value and a maximum of sales price column 1205 containing the highest sales price column value for the rows having each unique Division value. For example, the first row of the result table contains the division value "Retail," the sum of sales value "$134.00," and the maximum of sales value "$50.00," indicating that the retail division made $134 in sales, and its highest sales price was $50.

When an aggregation query specifies more than one aggregation result column, the facility preferably reiterates step 705 once for each aggregation result column. That is, after identifying the row of the result table corresponding to the grouping value of the current row of the source table, the facility preferably first aggregates the current aggregated value into the first aggregated result column, then aggregates the current aggregated value into the second aggregated result column, and so on. As an example, for the first row of the Sales Price index, the facility uses bitmaps to determine that the source table row with bookmark value "5" has grouping value "retail." The facility then identifies the result table row for the grouping value retail as the firs row. Then facility first aggregates the current Sales Price value, "$42.00," into the sum of sales price column of the first row of the result table using the sum aggregation function. The facility then aggregates "$42.00" into the maximum of sales price column of the first row of the result table using the maximum aggregation function.

While this invention has been shown and described with reference to preferred embodiments, it will be understood by those skilled in the art that various changes or modifications in form and detail may be made without departing from the scope of the invention. For instance, the facility may be used to perform aggregations in which each row of the result column corresponds to a group of one or more unique grouping column values. As an example, the Sales Price column of the Orders table could be aggregated over ranges of values of the Order Date column, e.g., "4/25/94" through "4/27/94", and "4/28/94" through "4/29/94," rather than over just individual dates. Also, many different types of relations may be used to map from bookmark to grouping column value.

I claim:

1. A method in a computer database system for aggregating a source table comprised of rows, each row having associated with it an aggregated value and a grouping value, the source table further having a grouping index on the grouping value of the rows of the source table and an aggregation index on the aggregated value of the rows of the source table, the method comprising the steps of:

creating a set of bitmaps mapping from row to grouping value from the grouping index;

using the aggregation index to identify the aggregated value of each row of the source table;

using information derived from the grouping index to identify the grouping value of each row of the source table by using the bitmaps to identify the grouping value of each row of the source table; and for each row of the source table, aggregating the identified aggregated value into a result value for the identified grouping value.

2. The method of claim 1, further including the step of generating a relation mapping from row to grouping value, and wherein the step of using information derived from the grouping index to identify the grouping value of each row of the source table includes the step of using the relation mapping to identify the grouping value of each row of the source table.

3. A method in a computer database system for aggregating a source table comprised of rows, each row having an aggregated value, a first grouping value, and a second grouping value, the method comprising the steps of:

maintaining a grouping index mapping from each unique permutation of the first grouping value and the second grouping value among the rows to the rows having that permutation of the first grouping value and the second grouping value;

maintaining an aggregation index on the rows;

using the aggregation index to identify the aggregated value of each row of the source table;

using the grouping index to identify the permutation of the first grouping value and the second grouping value for each row of the source table;

for each row, aggregating the identified aggregated value into a result value for the identified permutation of the first grouping value and the second grouping value;

using the grouping index to identify the first grouping value of each row of the source table; and for each row, aggregating the identified aggregated value into a result value for the identified first grouping value.

4. A method in a computer database system for efficiently aggregating a source table to produce a result table, the source table being comprised of rows and having a grouping column and an aggregated column, the columns each being comprised of one value for each row of the source table, the result table being comprised of one row for each unique value of the grouping column, the method comprising the steps of:

maintaining indices on the grouping column and the aggregated column, the index on the grouping column mapping from values of the grouping column to rows of the source table, the index on the aggregated column value mapping from values of the aggregated column to rows of the source table; and creating a series of bitmaps from the index on the grouping column, one bitmap for each of a plurality of values of the grouping column, each bitmap indicating whether each row of the source table has the corresponding value of the grouping column;

for each value of the aggregated column:

identifying the rows of the source table for which the aggregated column contains this value using the index on the aggregated column, and for each identified row of the source table for which the aggregated column contains the value:

identifying the value of the grouping columns for this row by interrogating the generated bitmaps in turn and identifying the value of the grouping column corresponding to the bitmap that indicates that this row of the source table has the corresponding value of the grouping column, and aggregating this aggregated column value into the result table for the identified grouping column value.

5. A method in a computer system for aggregating aggregated values of a plurality of data elements according to grouping values of the data elements, comprising the steps of:

(a) maintaining a relation relating aggregated values and the identity of data elements that have that aggregated value;

(b) maintaining a relation relating the identity of data elements and the grouping value of that data element by:

(1) maintaining an index on the grouping values, and (2) creating a set of bitmaps from the index on the grouping values that each identify the data entries having one grouping value;

(c) using the relation maintained in step (a) to identify the aggregated value of each data element;

(d) using the relation maintained in step (b) to identify the grouping value y of each data element; and (e) for each data element, aggregating the aggregated value identified in step (c) into a result value for the grouping value identified in step (d).

6. The method of claim 5 wherein step (a) includes the step of maintaining a relation from aggregated values to data element identities.

7. An apparatus for efficiently aggregating records, each having a grouping value and an aggregated value, comprising:

a record indexing subsystem for producing a grouping index and an aggregation index on the records;

a bitmap generator for generating a plurality of bitmaps, each corresponding to a unique grouping value and indicating whether each record has that grouping value; and an aggregation subsystem for aggregating the aggregated value for a record, derived from the aggregation index, into a result value for the grouping value for the record, derived from the grouping index, containing a bitmap application facility for deriving the grouping value for a record from the bitmaps generated by the bitmap generator.

* * * * *